United States Patent [19]

Burdick

[11] Patent Number: 5,481,143
[45] Date of Patent: Jan. 2, 1996

[54] SELF STARTING BRUSHLESS D.C. MOTOR

[76] Inventor: Brian K. Burdick, 80 Overland Trail, West Henrietta, N.Y. 14586

[21] Appl. No.: 151,809

[22] Filed: Nov. 15, 1993

[51] Int. Cl.$^6$ .......................... H02K 11/00; H02K 1/22; H02P 5/162

[52] U.S. Cl. ................... 310/68 B; 310/261; 310/266; 318/480

[58] Field of Search ............ 310/68 B, 1, 162, 310/166, 261, 164, 266, 269, 49 R; 318/138, 254, 480; 250/231.13, 231.14

[56] References Cited

U.S. PATENT DOCUMENTS

| | | | |
|---|---|---|---|
| 3,023,330 | 2/1962 | Roters | 310/132 |
| 3,096,467 | 7/1963 | Angus et al. | 318/138 |
| 3,396,296 | 8/1968 | Esters | 310/266 |
| 3,535,566 | 10/1970 | Smith | 310/266 |
| 3,579,277 | 5/1971 | Imahashi | 310/156 |
| 4,220,879 | 9/1980 | Hoshimi et al. | 310/68 R |
| 4,459,501 | 7/1984 | Fawzy | 310/164 |
| 4,608,505 | 8/1986 | Schumacher | 310/261 |
| 4,731,554 | 3/1988 | Hall et al. | 310/266 |
| 4,761,590 | 8/1988 | Kaszman | 310/254 |
| 4,857,783 | 8/1989 | Prunkard | 310/68 B |
| 4,882,524 | 11/1989 | Lee | 318/254 |
| 4,973,869 | 11/1990 | Cho | 310/68 B |
| 5,093,599 | 3/1992 | Horng | 310/254 |
| 5,120,706 | 6/1992 | Weeks, II | 310/52 |
| 5,179,307 | 1/1993 | Porter | 310/68 B |
| 5,235,180 | 8/1993 | Montagu | 250/231.13 |
| 5,252,824 | 10/1993 | Picanyol | 250/231.13 |
| 5,258,697 | 11/1993 | Ford et al. | 318/254 |

FOREIGN PATENT DOCUMENTS 2726948  1/1979  Germany ..................... 310/68 R

*Primary Examiner*—Clayton E. LaBalle
*Attorney, Agent, or Firm*—Sean F. Sullivan; David L. Baker; Rhodes & Ascolillo

[57] ABSTRACT

A self-starting, brushless direct current motor including a rotor assembly, a stator assembly, the stator assembly including a circular ring member and a plurality of electromagnets positioned circumferentially around the circular ring member, and a triggering mechanism for energizing and deenergizing each of the electromagnets in a predetermined sequence to produce a rotary motion of the rotor assembly.

4 Claims, 4 Drawing Sheets

SELF STARTING BRUSHLESS D.C. MOTOR

BACKGROUND OF THE INVENTION

1. Field of the Invention

The present invention relates generally to a brushless direct current motor and, more particularly, to a self-starting, brushless direct current motor comprising a rotor, a stator, and a plurality of electromagnets activated by infrared phototransistors.

2. Description of the Related Art

U.S. Pat. No. 3,579,277 relates to a brushless direct current motor. Pairs of axially spaced permanent magnets are radially arranged about and fixed to a rotor shaft, and driving coils are disposed in the space between the pairs of permanent magnets. A shield ring having cutaway portions is disposed in the path of detecting coils so that when the cutaway portions are aligned with positional detecting coils, the driving coils associated with the particular detecting coils are activated to produce a driving force.

U.S. Pat. No. 4,220,879 relates to a brushless direct current motor comprising a rotor, stator, and detecting elements. The rotor includes a rotor magnet, with a number of poles, mounted on a rotor yoke which in turn is mounted on a rotor shaft. The stator includes a stator yoke and a number of stator coils disposed on the stator yoke to face the rotor magnet in a non-overlapping predetermined angular relation to each other. Wiring means are disposed on the stator yoke and are connected to the stator coils. The detecting elements are mounted on the wiring means to sense the rotational position of the rotor magnet and provide a signal by which current fed to the stator coils can be controlled.

U.S. Pat. No. 4,857,783 relates to a brushless direct current motor which comprises a rotor, a magnetic leaf switch, and a ferrous core coil winding. The rotor incorporates a flat, annular two pole permanent magnet and a rotational output shaft passing through the magnet. The magnetic leaf switch floats in the magnetic field of the permanent magnet. The ferrous core coil winding serves as a stator which is energized by direct current. Current flow to the stator is controlled in an alternating on-off manner by the magnetic leaf switch. When the stator is energized, the core assumes a polarity that repels one of the poles of the permanent magnet carried by the rotor. This repulsion causes rotation of the permanent magnet about the longitudinal axis of the rotational output shaft.

U.S. Pat. No. 4,973,869 relates to a disc type brushless, cordless direct current motor. The motor comprises a rotor, stator, armature coil, and a position detector sensor. The position detector sensor is installed below an effective coil part of the armature coil. A single screw having a rounded head is installed at the position one-fifth of a magnetic pole width apart from the position detector sensor. This type of placement provides for a larger starting torque with a lower starting voltage.

U.S. Pat. No. 5,093,599 relates to a brushless direct current motor comprising a stator base whose two side discs have notches and feet that the polar plates can engage with. The feet pass through the two polar plates and the holes of a circuit board.

U.S. Pat. No. 5,179,307 relates to a variable speed, reversible, brushless direct current motor. The motor comprises a rotor, electromagnets, a switching transistor module, and an electronic controller module. The rotor is mounted on a shaft with bearings at each end, with a plurality of permanent magnets symmetrically placed thereon in an alternating field pattern. Each electromagnet invokes a magnetic field at two permanent magnet positions to cause rotation of the rotor.

SUMMARY OF THE INVENTION

Traditional direct current motors that are used in industry today consist of an armature connected to a rotor shaft and a stator assembly which provides a constant magnetic field via either permanent magnets or electromagnets constructed from field windings. The armature is energized by brushes through a commutator which, in the presence of a magnetic field, causes the rotor assembly to rotate. Brushless direct current motors, which are also well known in the art, are generally smaller and more efficient than conventional direct current motors. However, many of these brushless motor designs make use of a combination of electromagnets and permanent magnets, along with complicated rotor position detecting circuitry in order to generate the proper polarity required to turn the rotor.

Additionally, in both conventional and brushless direct current motor designs, only one pole of a permanent magnet or an electromagnet is used in producing a rotary output. The other end of the magnetic field is lost into the core of the stator or the armature.

Accordingly, it is a principal object of the present invention to provide a brushless direct current motor which operates without the need for energizing an armature.

It is a further object of the invention to provide a rotor assembly which makes more efficient use of the magnetic flux generated by the stator electromagnets. This may be accomplished by utilizing both poles of each electromagnet to produce a useable rotary output.

It is still a further object of the invention to provide a brushless direct current motor which overcomes the need for complicated rotor position sensing circuitry.

It is still a further object of the invention to provide a brushless direct current motor which is self-starting and which can be reversible after making a simple mechanical adjustment to the rotor assembly.

The present invention achieves the above objects, among others, by providing, in one aspect, a self-starting, brushless direct current motor including: a rotor assembly; a stator assembly, the stator assembly including a circular ring member and a plurality of electromagnets positioned circumferentially around the circular ring member; and a triggering mechanism for energizing and deenergizing each of the electromagnets in a predetermined sequence to produce a rotary motion of the rotor assembly.

Preferably, the triggering mechanism includes a slotted disk member, a first circuit board, and a second circuit board. The first circuit board includes a plurality of infrared light emitting diodes; the second circuit board includes a plurality of infrared phototransistors for receiving infrared signals from the light emitting diodes; and the slotted disk member is positioned between the first and second circuit boards for selectively passing the infrared signals from the light emitting diodes to the phototransistors. Additionally, each of the infrared light emitting diodes is positioned opposite one of the phototransistors, forming a diode/phototransistor pair, wherein the pairs are arranged in a circular fashion. Each of the phototransistors, when activated, energizes one of the electromagnets. The slotted disk member includes a pair of slots, disposed at substantially a 180 degree angle with respect to one another, the pair of slots passing the infrared signals from the light emitting diodes to the phototransistors.

In another aspect, the invention generally features a self-starting, brushless direct current motor including: a rotor assembly, the rotor assembly including a shaft, a slotted disk member, the disk member being connected to a first end of the shaft, and a pair of C-shaped channel members, the channel members being connected to a second end of the shaft; a stator assembly, the stator assembly including a circular ring member and a plurality of electromagnets positioned circumferentially around the circular ring member; and a triggering mechanism for energizing and deenergizing each of the electromagnets in a predetermined sequence to produce a rotary motion of the rotor assembly.

Preferably, each of the C-shaped channel members partially surrounds each of the electromagnets, creating a substantially constant air gap between the C-shaped channel members and the electromagnets.

In yet another aspect, the invention generally features a self-starting, brushless direct current motor including: a rotor assembly, the rotor assembly including a shaft, a slotted disk member, the disk member being connected to a first end of the shaft, and a pair of C-shaped channel members, the channel members being connected to a second end of the shaft; a stator assembly, the stator assembly including a circular ring member and a plurality of electromagnets positioned circumferentially around the circular ring member, each of the electromagnets being powered by a direct current source, each of the C-shaped channel members partially surrounding each of the electromagnets, creating a substantially constant air gap between the C-shaped channel members and the electromagnets; and triggering means for energizing and deenergizing each of the electromagnets in a predetermined sequence to produce a rotary motion of the rotor assembly. The triggering means includes: the slotted disk member; a first circuit board; and a second circuit board, the first circuit board comprising a plurality of infrared light emitting diodes, the second circuit board comprising a plurality of infrared phototransistors for receiving infrared signals from the light emitting diodes, and the slotted disk member being positioned between the first and second circuit boards for selectively passing the infrared signals from the light emitting diodes to the phototransistors. Each of the infrared light emitting diodes is positioned opposite one of the phototransistors, forming a diode/phototransistor pair, the diode/phototransistor pairs being arranged in a circular fashion. Each of the phototransistors, when activated, energizes one of the electromagnets. The slotted disk member includes a pair of slots, disposed at substantially a 180 degree angle with respect to one another, the pair of slots passing the infrared signals from the light emitting diodes to the phototransistors.

DESCRIPTION OF THE PREFERRED EMBODIMENT

Figure 1:
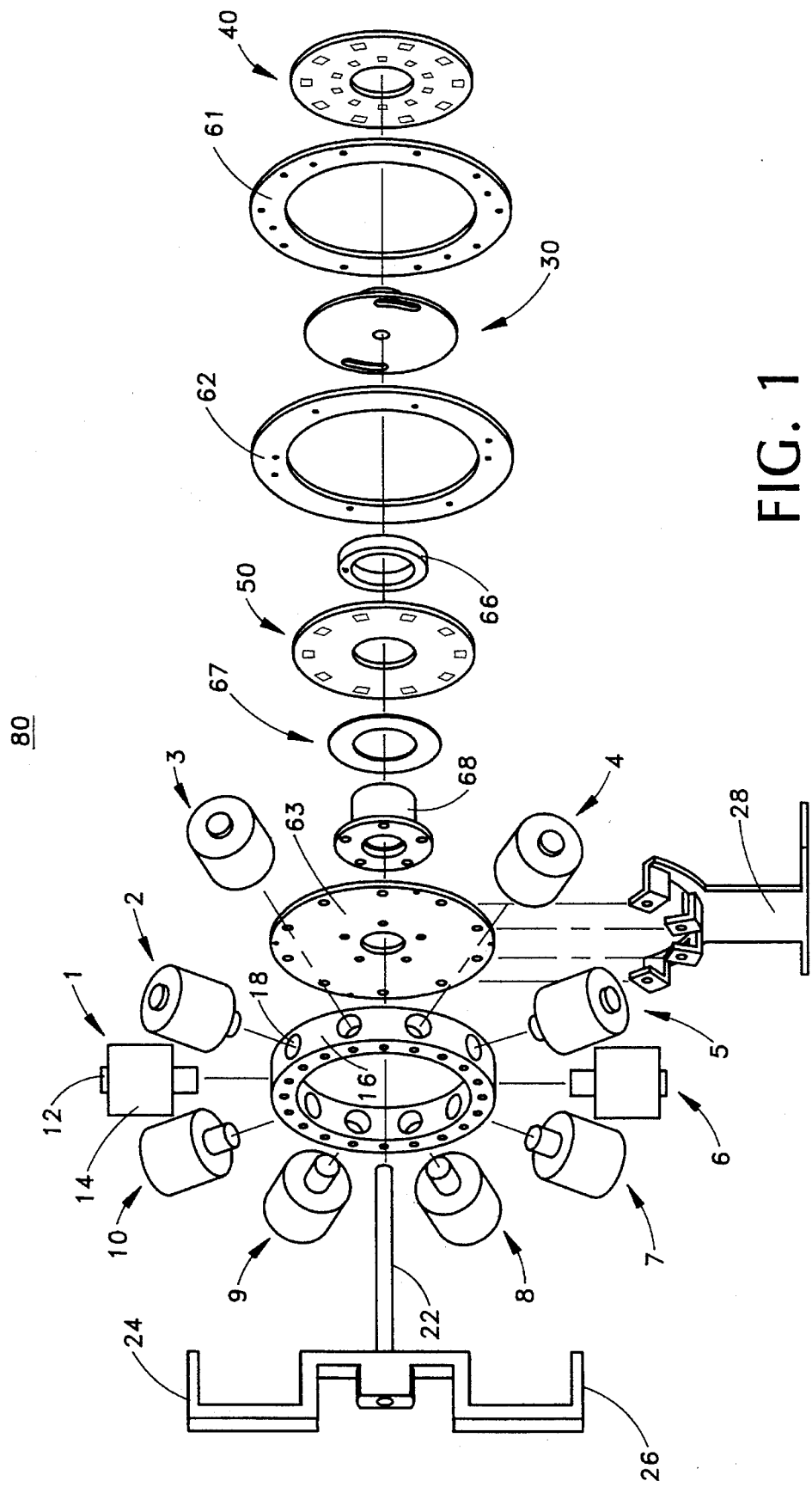
FIG. 1 is an exploded perspective view of a self-starting, brushless direct current motor according to the present invention.
Figure 2:
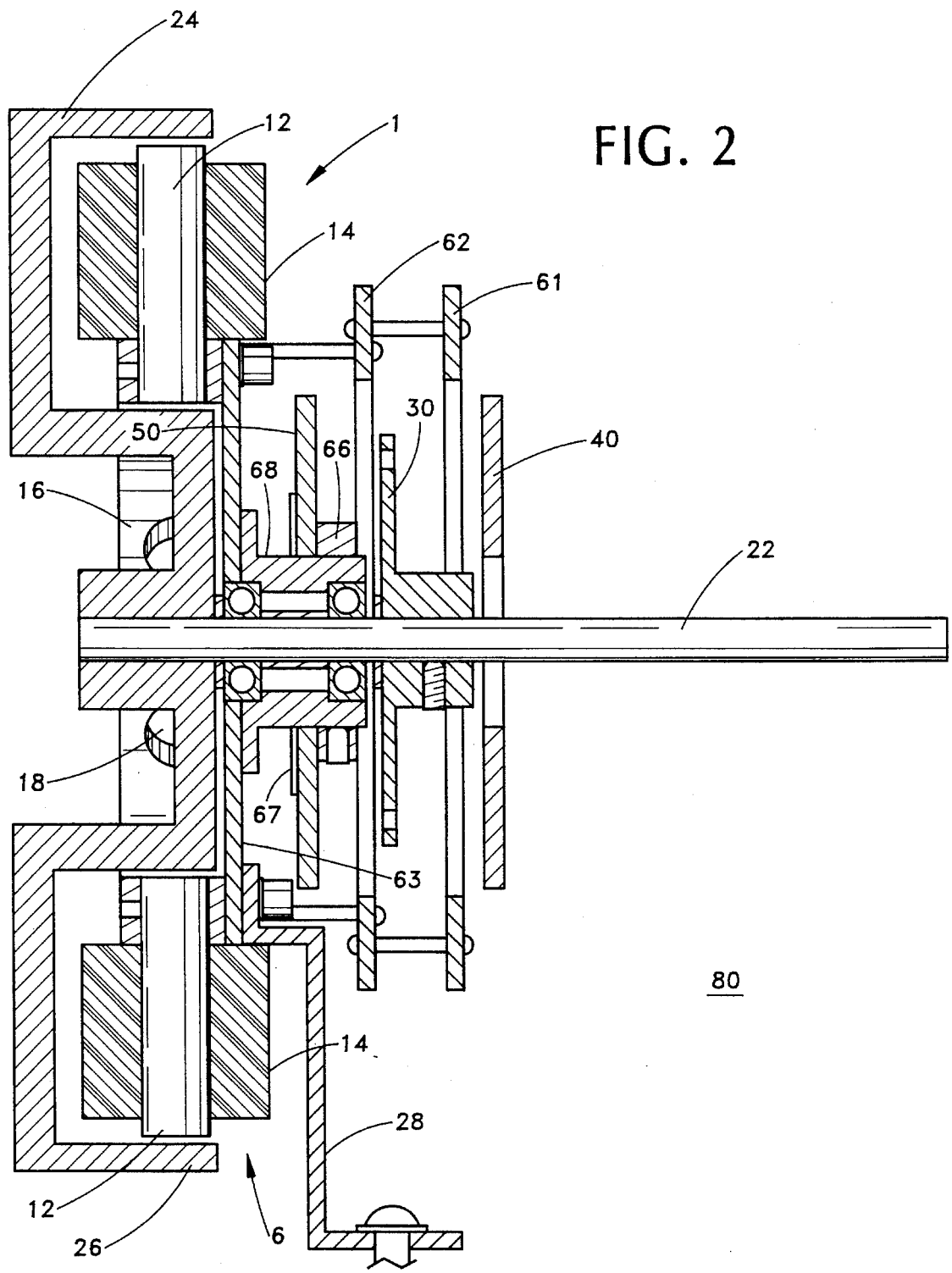
FIG. 2 is a cross sectional elevational view of the assembled brushless direct current motor according to the present invention.
Figure 4:
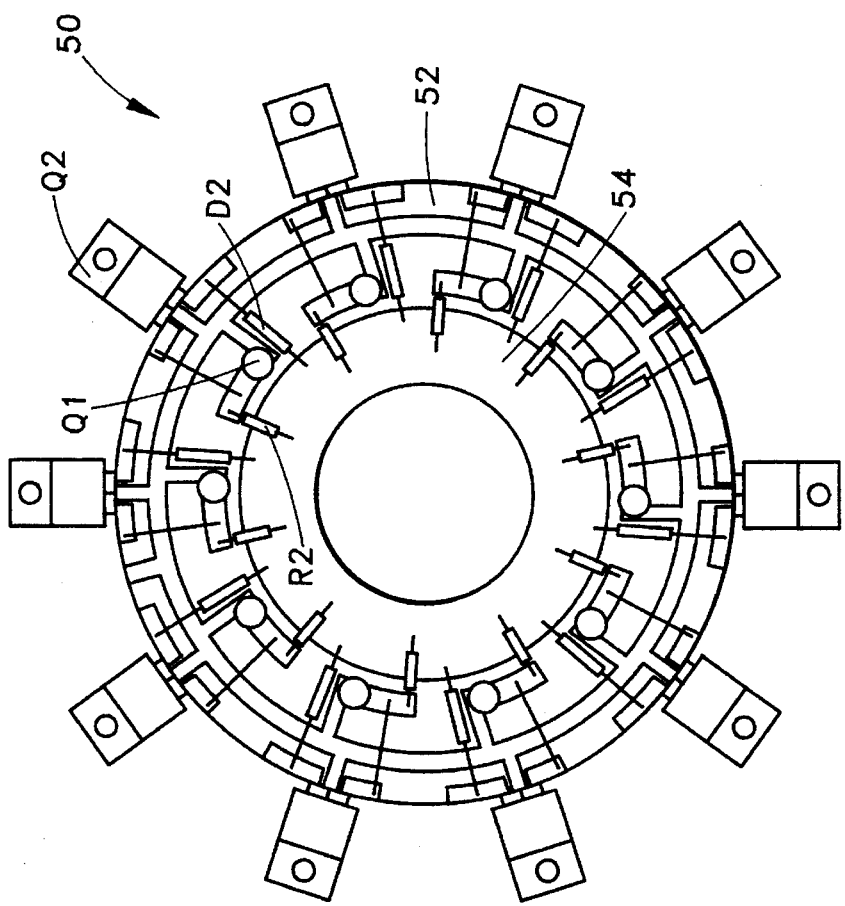
FIG. 4 is a plan view of the second circuit board according to the present invention.
Figure 3:
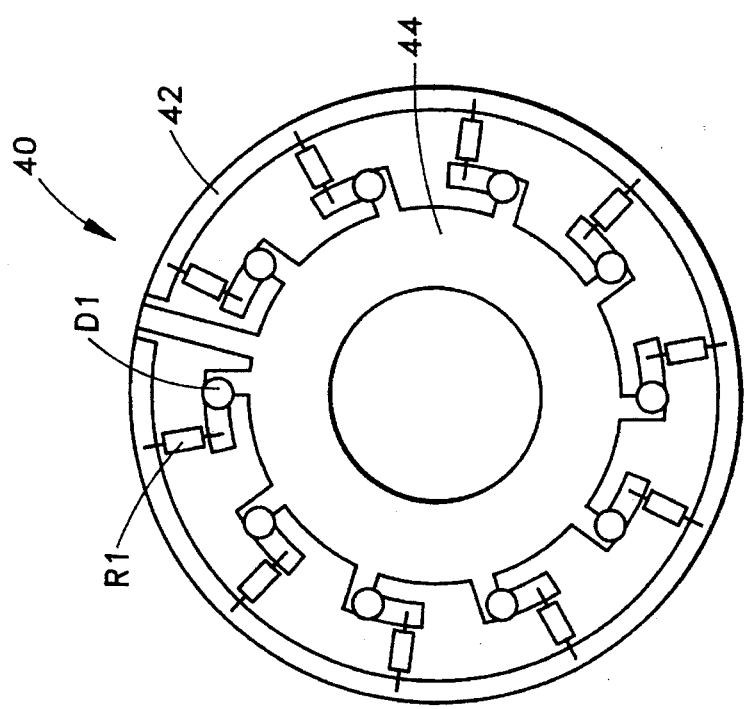
FIG. 3 is a plan view of the first circuit board according to the present invention.

Referring initially now to FIGS. 1 and 2, there is shown a self-starting, brushless direct current motor designated generally by reference numeral 80. The motor 80 includes a rotor assembly which consists of a rotor shaft 22, a pair of linearly positioned steel C-shaped channel pieces 24 and 26 which are located at one end of the rotor shaft 22, and a slotted disk member 30 which is attached to and which rotates with the shaft 22. The motor 80 further includes a stator assembly which consists of a circular aluminum ring assembly 16 for housing a plurality of electromagnet assemblies 1 through 10, a main frame face plate 63, a main hub assembly 68, a circuit board insulator 67, a circuit board retaining ring 66, a lower heat sink 62, an upper heat sink 61, a first circuit board 40, a second circuit board 50, and a mounting bracket 28.

Each of the electromagnet assemblies 1 through 10 comprises a coil wound steel cylinder 12 and a cylindrical outer plastic coating 14 which is secured to the steel cylinder 12 by epoxy or the like. The electromagnet assemblies 1 through 10 are circumferentially disposed around the aluminum ring assembly 16 by inserting one end of the steel cylinder 12 into a corresponding hole 18 in the ring assembly 16.

From FIG. 2, it can be seen that the C-shaped channel pieces 24 and 26 connected to the rotor shaft 22 partially surround the electromagnet assemblies 1 through 10 as they rotate about their axis, creating a substantially constant air gap between the channel pieces 24, 26 and the outer ends of each electromagnet cylinder 12. As will be shown, this configuration of the rotor assembly makes more efficient use of the magnetic flux generated by the electromagnet assemblies 1 through 10.

Referring now to FIGS. 3 through 6, electronic triggering of the motor 80 is achieved by the operation of the first and second circuit boards 40 and 50, in conjunction with the slotted disk member 30. The first circuit board 40 includes a plurality of infrared, light emitting diodes D1, a corresponding plurality of load resistors R1, a positive voltage grid 42, and a negative voltage grid 44 which is connected to ground. The second circuit board 50 includes a plurality of phototransistors Q1, load resistors R2, power transistors Q2 (typeE3055T), and diodes D2. The positive voltage connection is applied to the second circuit board 50 through a grid 52, and the negative connection is applied through another grid 54 which is connected to ground.

Figure 5:
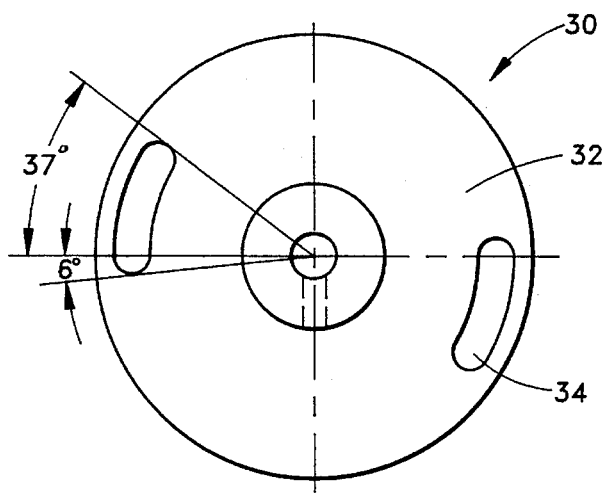
FIG. 5 is a plan view of the slotted disk member used to trigger the electromagnet energizing sequence according to the present invention.

FIG. 5 illustrates the configuration of the slotted disk member 30. It includes a steel disk piece 32 and a pair of slots 34 disposed substantially at a 180 degree angle with respect to one another. The first and second circuit boards 40, 50 are positioned such that each infrared diode D1 of the first circuit board 40 is directly aligned with a corresponding phototransistor Q1, as shown in FIGS. 1 and 2. The slotted disk member 30 is positioned between the first and second circuit boards 40, 50 along a common axis, namely the rotor shaft 22.

Figure 6:
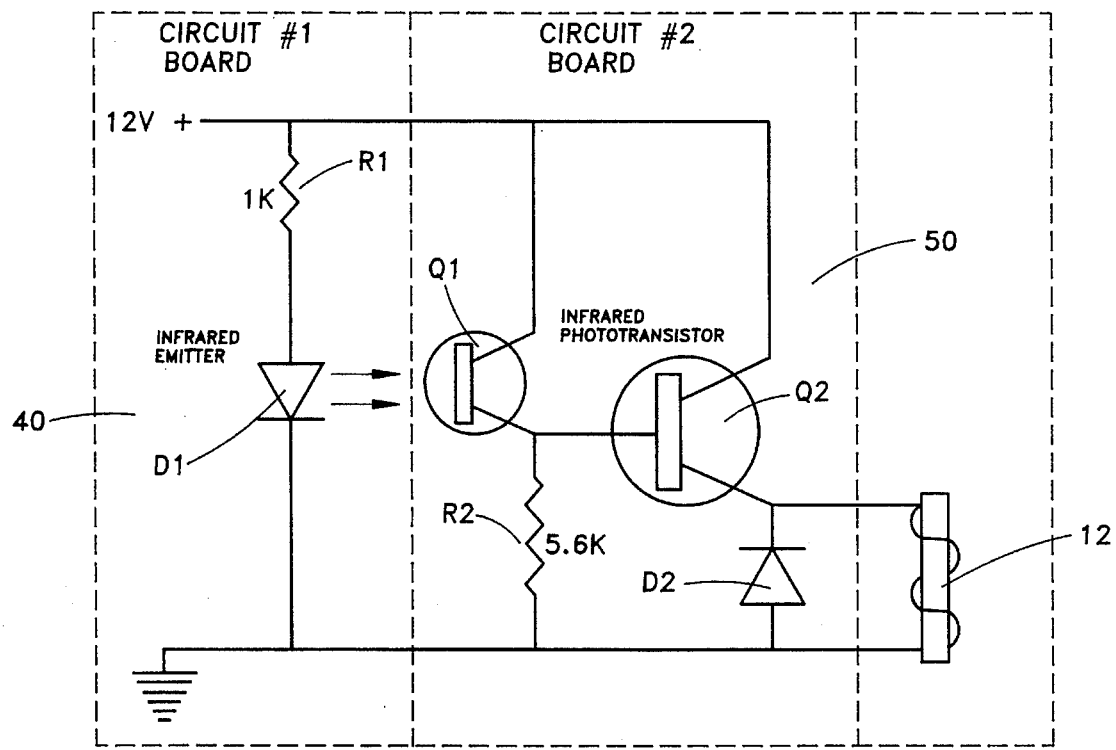
FIG. 6 is a schematic wiring diagram of the first and second circuit boards according to the present invention.

Referring now to FIGS. 5 and 6, the motor 80 is energized with a +12 volt DC source. At this point, current will flow through each of the infrared, light emitting diodes D1 in the first circuit board. However, the slotted disk member 30 will only permit signals from a single pair of the infrared diodes D1 to pass through to their corresponding phototransistors Q1 of the second circuit board. Once a particular phototransistor Q1 is turned on by the infrared signals, a positive voltage is applied to the base of a transistor Q2 which causes current to flow through the emitter of the transistor Q2 and energize the corresponding coil wound cylinder 12 of the corresponding electromagnet assembly. As infrared signals are blocked by the slotted disk member 30, a particular phototransistor Q1 will be turned off, thus deenergizing the corresponding electromagnet assembly.

In describing the turning sequence of the rotor assembly, it will be assumed for simplicity's sake that, at rest, the C-shaped channel pieces 24, 26 of the rotor assembly are initially positioned directly over the outer poles of electromagnet assemblies 1 and 6, respectively, as illustrated in FIGS. 1 and 2. The slotted disk member 30 is oriented on the shaft 22 such that when power to the motor 80 is provided, only electromagnet assemblies 10 and 5 will be energized at first. This causes the steel channel pieces 24 and 26 to be attracted to electromagnet assemblies 10 and 5, respectively. A torque is therefore produced on the rotor shaft 22 which causes a counterclockwise rotation of the rotor assembly. As the rotor shaft 22 begins to turn in a counterclockwise direction, the slotted disk member 30 also turns with the shaft 22. Just as the channel pieces 24 and 26 approach the outer poles of electromagnet assemblies 10 and 5, the slotted disk member 30 will cause power to those magnets to be cut off. At the same time, the next pair of electromagnet assemblies 9 and 4 will energize and attract channel pieces 24 and 26, thus continuing the counterclockwise rotation. Each time the channel pieces 24, 26 approach the poles of a pair of energized electromagnets, those electromagnets are deenergized as the next pair of electromagnets in sequence are energized.

In the illustrated embodiment, the motor 80 runs at a no load speed of approximately 1000 RPM, with a no load current of approximately 1.2 amperes and a full load current of approximately 1.8 amperes. It should also be noted that the motor 80 will run in reverse if the slotted disk member 30 is adjusted with respect to the rotor shaft 22 such that the slots 34 of the disk 30 permit the magnets to be energized in a clockwise sequence.

There are several advantages that this device provides over the prior art. First, there is no need for complicated rotor position sensing circuitry, since the slotted disk member acts as a "trigger wheel" by allowing magnets to be energized in the proper sequence. Second, there is no magnetic drag on the rotor assembly, since each electromagnet assembly is deenergized just as the channel members of the rotor assembly pass over the poles. Third, the motor will operate even if one or more of the diode/phototransistor combinations fail, since each electromagnet assembly is powered from its own diode/phototransistor pair. Finally, the device makes more efficient use of the magnetic flux produced by the electromagnet assemblies in that both poles of each electromagnet assembly are utilized in producing output torque.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A self-starting, brushless direct current motor comprising:

(a) a stator assembly;
   (b) a rotor assembly which is rotatingly disposed within said stator assembly, said rotor assembly comprising a shaft, a slotted disk member, said disk member being connected to a first end of said shaft, and a pair of C-shaped channel members, said channel members being connected to a second end of said shaft;
   (c) said stator assembly comprising a circular ring member and a plurality of electromagnets positioned circumferentially around said circular ring member; and
   (d) triggering means for energizing and deenergizing each of said electromagnets in a predetermined sequence to produce a rotary motion of said rotor assembly.

2. A self-starting, brushless direct current motor according to claim 1 wherein each of said C-shaped channel members partially surrounds each of said electromagnets, creating a substantially constant air gap between said C-shaped channel members and said electromagnets.

3. A self-starting, brushless direct current motor comprising:

a stator assembly;
   a rotor assembly which is rotatingly disposed within said stator assembly, said rotor assembly comprising a shaft, a slotted disk member, said disk member being connected to a first end of said shaft, and a pair of C-shaped channel members, said channel members being connected to a second end of said shaft;
   said stator assembly comprising a circular ring member and a plurality of electromagnets positioned circumferentially around said circular ring member, each of said electromagnets being powered by a direct current source;
   each of said C-shaped channel members partially surrounding each of said electromagnets, creating a substantially constant air gap between said C-shaped channel members and said electromagnets; and
   triggering means for energizing and deenergizing each of said electromagnets in a predetermined sequence to produce a rotary motion of said rotor assembly, said triggering means comprising:
   said slotted disk member;
   a first circuit board; and
   a second circuit board;
   said first circuit board comprising a plurality of infrared light emitting diodes;
   said second circuit board comprising a plurality of infrared phototransistors for receiving infrared signals from said light emitting diodes; and
   said slotted disk member being positioned between said first and second circuit boards for selectively passing said infrared signals from said light emitting diodes to said phototransistors;
   each of said infrared light emitting diodes being positioned opposite one of said phototransistors, forming a diode/phototransistor pair, said diode/phototransistor pairs being arranged in a circular fashion;
   each of said phototransistors, when activated, energizing one of said electromagnets;

said slotted disk member comprising a pair of slots, disposed at substantially a 180 degree angle with respect to one another, said pair of slots passing said infrared signals from said light emitting diodes to said phototransistors.

4. A method for controlling energization of the electromagnets of a motor, the motor having a stator assembly and a rotor assembly, wherein a plurality of electromagnets are circumferentially mounted around the stator assembly, with said plurality of electromagnets each having a pair of magnetic poles, wherein a pair of C-shaped steel pieces are mounted on one end of the rotor assembly, the pair of C-shaped pieces partially and periodically surrounding each electromagnet during rotation thereof, comprising:

energizing a first of the plurality of electromagnets, thereby creating a magnetic attractive force between said first electromagnet and one of the pair of C-shaped pieces of the rotor, causing the entire rotor to turn;

deenergizing the first electromagnet as soon as one of the pair of C-shaped channels becomes aligned with the pair of magnetic poles of the first electromagnet;

immediately energizing the next electromagnet in sequence, thereby attracting the rotor to the next electromagnet and continuing the attractive rotation of the rotor; and continuously repeating the above sequence so that one of the pair of C-shaped channels continuously follows an energized electromagnet.

* * * * *